3,833,521
PROCESS FOR THE PARTIAL DEACYLATION OF POLY(N-ACYL-ALKYLENIMINES)

Bernhard Karbstein and Gerd Scheppers, Marl, Germany, assignors to Chemische Werke Huls Aktiengesellschaft, Marl, Germany
No Drawing. Filed Oct. 5, 1972, Ser. No. 295,168
Claims priority, application Germany, Oct. 15, 1971, P 21 51 379.1
Int. Cl. C08g *33/08*
U.S. Cl. 260—2 EN          15 Claims

ABSTRACT OF THE DISCLOSURE

A process for the production of partially deacylated poly(N-acyl-alkylenimines) which comprises reacting a poly(N-acyl-alkylenimine) of the formula

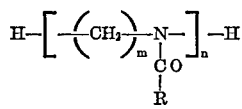

wherein $m$ is 2 or 3, $n$ is an integer of 10–5,000, and R is alkyl of 1–12 carbon atoms, aralkyl of 7–12 carbon atoms, aryl of 8–12 carbon atoms, or substituted aryl of 6–12 carbon atoms, with an alkanolamine at a temperature of 150°–250° C., optionally in the presence of an inert solvent. Deacylation in the absence of concentrated mineral acids or inorganic salts facilitates recovery of the deacylated product.

BACKGROUND OF THE INVENTION

The present invention relates to a process for the production of partially deacylated poly(N - acyl - alkylenimines).

It is known to deacylate poly(N-acetyl-ethylenimine) by refluxing with excess sulfuric acid; see, for example, Journ. Polymer Sci., Part A, vol. 4, p. 2263 (1966). It is also known from German Unexamined Published Application 1,720,437 to prepare partially deacylated poly(N-acyl-ethylenimines) by reacting poly(N-acyl-ethylenimines) in the liquid phase by heating with an amount of dilute mineral acid required for the desired degree of deacylation, mixing the thus-obtained mineral acid salts of the partially deacylated and/or partially hydrolyzed poly(N-acyl-ethylenimines) with a base, and isolating the free, partially saponified poly(N-acyl-ethylenimines).

One inherent disadvantage in all deacylation methods utilizing mineral acids is that the thus-formed mineral acid salts must be worked up in a separate, expensive process stage. The use of ion exchangers for this purpose is complicated and costly, due inter alia to complicated solubility conditions. Even when using inexpensive alkali and alkaline earth hydroxides, the working-up procedure is rather expensive, since partially saponified poly(N-acyl-ethylenimines) free of mineral salt can be isolated only from an entirely dewatered and well-filtered reaction solution.

OBJECTS OF THE INVENTION

Accordingly, it is a general object of this invention to provide an improved process for the production of partially deacylated poly(N-acyl-alkylenimines).

Another object of this invention is to provide a process for the production of partially deacylated poly(N-acyl-alkylenimnes) in the absence of high concentrations of mineral acids or mineral salts.

A further object of this invention is to provide a process for the production of partially deacylated poly(N-acyl-alkylenimines) wherein the recovery of final product is greatly simplified.

Upon further study of the specification and appended claims, further objects and advantages of this invention will become apparent to those skilled in the art.

SUMMARY OF THE INVENTION

Briefly, the above and other objects are attained in one aspect of this invention by providing a process for the partial deacylation of poly(N-acyl-alkylenimines) which comprises transamidating a poly(N-acyl-alkylenimine) of the formula

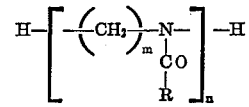

wherein $m$ is 2 or 3, $n$ is an integer of 10–5,000, and R is alkyl of 1–12 carbon atoms, aralkyl of 7–12 carbon atoms, aryl of 6–12 carbon atoms, or substituted aryl of 6–12 carbon atoms, with an alkanolamine at a temperature of 150–250° C., optionally in the presence of an inert solvent.

DETAILED DISCUSSION

The poly(N-acyl-alkylenimines) suitable for the process of this invention can be prepared in a conventional manner by the polymerization of $\Delta^2$-oxazolines and/or 4H-5,6-dihydrooxazines using a cationic catalyst, e.g., sulfuric acid or dialkyl sulfates. The value for the degree of polymerization $n$ is 10–5,000, preferably 300–1,300.

Poly(N-acyl alkylenimines) of the above formula useful in the process of this invention are those wherein acyl indicates a monovalent radical derived from a carboxylic acid or functional derivative thereof, preferably those wherein R is linear or branched saturated aliphatic alkyl, more preferably of 1–12 carbon atoms. Suitable alkyl groups include but are not limited to methyl, ethyl, n-propyl, isopropyl, n-butyl, isobutyl, t-butyl, n-undecyl, etc. Also suitable are those compounds wherein R is aralkyl of 7–12 carbon atoms, preferably derived from alkylbenzenes with one or more alkyl groups of 1–6 carbon atoms substituted on the aromatic benzene ring. Suitable aralkyl groups include but are not limited to benzyl, phenethyl, etc. R can also be aryl of 6–12 carbon atoms, preferably phenyl, which furthermore can be substituted by one or more groups on the aromatic ring such as lower-alkyl, e.g., methyl.

The residue R can be identical or different along the polymer chain. Eminently suitable poly(N-acyl-alkylenimines) are poly(N-acetyl-ethylenimines) and poly(N-benzoyl-ethylenimines).

Alkanolamines suitable for the transamidation are lower alkanolamines, preferably those of 1–3 carbon atoms in the alkyl group. Suitable alkanolamines include but are not limited to ethanolamine, 1,3-propanolamine and iso-propanolamine. Ethanolamine has proved to be particularly advantageous in the process of this invention.

The quantitative ratio of the starting compounds utilized in the process of this invention can be varied to any desired ratio, depending on the desired degree of deacylation. Generally, the poly(N-acyl-alkylenimines) are employed with a molar excess of alkanolamine, based on the acyl groups of the poly(N-acyl-alkylenimines). Preferably, the reaction to obtain 10 to 96% deacylation is conducted with a molar ratio of alkanolamine to acyl groups of the poly(N-acyl-alkylenimines) of 2:1 to 5:1, and especially advantageously with a molar ratio of 3:1.

The process of this invention is generally effected without an inert diluent or solvent. However, it is often advantageous to conduct the transamidation in the presence of an inert solvent, especially when a molar excess of alkanolamine, based on the acyl groups of the poly(N-acyl-alkylenimines), is utilized. While a solvent will generally be used in a 2–5 fold excess based on the poly(N-acyl-alkylenimines), it is also possible to replace the above-mentioned excess portion of the alkanolamine entirely or partially by a suitable solvent. Suitable transamidation solvents are well-known in the art and include but are not limited to methanol and isopropanol.

The process of the present invention is carried out at a temperature of 150–250° C. Since these temperatures are in most cases above the boiling temperatures of the alkanolamines and/or of the solvents, the transamidation is preferably conducted in an autoclave under internally generated autogenous pressure. For this purpose, temperatures of 190–220° C. have proved to be particularly advantageous.

The transamidation can be effected discontinuously as well as continuously. The degree of deacylation, dependent on the individual reaction conditions, amounts to maximally 96%. The degree of deacylation obtained with a given set of reaction conditions can be varied in a reproducible manner solely by modifying the duration of the reaction and can be determined quantitatively by IR spectroscopy as well as by determining the amount of the N-acyl-alkanolamine formed as a by-product. Under the preferred reaction conditions, i.e., a threefold molar amount of alkanolamine with respect to the acyl groups and at 190–220° C. in an autoclave, the time required for 10 to 96% deacylation is 6–9 hours.

The partially deacylated poly(N-acyl-alkylenimines) can be isolated by dissolving the reaction mixture in water and precipitating the partially deacylated poly(N-acyl-alkylenimine) with the aid of a known precipitant, e.g., acetone. However, if more than 30% of the amide groups have been transamidated. this step is advantageously conducted without a precipitant, since the partially deacylated poly(N-acyl-alkylenimine) can then be precipitated by cooling the aqueous solution to a temperature of 30–10° C. or less. The preferred method of isolation, however, which can be utilized independently of the degree of conversion, separates the thus-formed N-2- and/or N-3-hydroxyalkylcarboxylic acid amide, together with the unreacted alkanolamine, from the partially deacylated poly(N-acyl-alkylenimine) remaining in the residue under vacuum with the aid of a thin-film evaporator. Using this technique, the yields of partially deacylated poly(N-acyl-alkylenimines) range between 90% and 100%.

The partially deacylated poly(N-acyl-alkylenimines) produced according to the process of this invention are white to yellowish powders which solidify in the manner of a wax after melting. They are insoluble or exhibit poor solubility in ether, petroleum ether, isopropyl alcohol, dioxane, tetrahydrofuran, benzene, carbon tetrachloride and ethyl acetate. In contrast thereto, they are readily soluble in methanol or chloroform.

The N-2-hydroxyethyl-carboxylic acid amide isolated as a by-product in the reaction of poly(N-acyl-ethylenimines) with ethanolamine can be converted, e.g., by gas-phase dehydration, into $\Delta^2$-oxazoline, and the latter can be converted by polymerization into poly(N-acyl-ethylenimines) utilized as the starting material for the process of this invention. The process is thereby rendered particularly economical in this case.

The products produced according to the present invention are suitable as auxiliary agents for water treatment, as well as paper adjuvants and textile softeners (German Unexamined Published Application 2,046,304) or they can serve as starting materials for such products.

The examples set forth below serve to explain the process of this invention.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLES 1–5

Poly(N-acetyl-ethylenimine), $n$ about 3000, was admixed with ethanolamine and heated to 200° C. in a stirrer-equipped autoclave having a capacity of 250 ml. for the time periods indicated below. The reaction mixture was then dissolved in an equal amount by weight of water of a temperature of 70° C., and the resultant mixture was added dropwise to a tenfold excess of acetone; during this step, the deacylation products were precipitated and could be separated. N-(2-hydroxyethyl)acetamide was isolated from the liquid phase by distillation, and the degree of deacylation was determined from the amount of this compound recovered.

TABLE 1

| Example | Poly(N-acetyl-ethylenimine) | Ethanolamine | Time (hr.) | Amount of amide formed | Degree of deacylation (percent) |
|---|---|---|---|---|---|
| 1 | 0.47 mol=40 g | 1.41 mol=86 g | 2 | 0.175 mol=18.02 g | 37.2 |
| 2 | 0.47 mol=40 g | 1.41 mol=86 g | 3 | 0.197 mol=20.3 g | 41.9 |
| 3 | 0.47 mol=40 g | 1.41 mol=86 g | 5 | 0.256 mol=26.4 g | 54.5 |
| 4 | 0.47 mol=40 g | 1.41 mol=86 g | 5 | 0.344 mol=35.4 g | 73.2 |
| 5 | 0.47 mol=40 g | 1.41 mol=86 g | 6 | 0.342 mol=36.2 g | 72.7 |

EXAMPLES 6–11

The production of larger amounts (about 1 kg.) of partially deacylated poly(N - acetyl - ethylenimines), $n$ about 3000, was conducted in a 10-liter autoclave at 200° C.; the autoclave was equipped with a hydraulic agitator and an electrical heating unit. The amounts of poly(N-acetyl - ethylenimine) and ethanolamine employed, the quantities of acetamide, and the degrees of deacylation, as well as the reaction times, are indicated in Table 2. The reaction product was worked up by removing the thus-formed acetamide and the excess ethanolamine in a thin-film evaporator at about 200° C./0.3 mm. Hg. The amide was isolated by subsequent redistillation.

TABLE 2

| Example | Poly(N-acetyl-ethylenimine) | Ethanolamine | Time (hr.) | Amount of amide formed | Degree of deacylation (percent) |
|---|---|---|---|---|---|
| 6 | 22.3 mol=1,900 g | 67 mol=4,100 g | 1 | 6.65 mol=685 g | 29.8 |
| 7 | 22.3 mol=1,900 g | 67 mol=4,100 g | 2 | 10.68 mol=1,100 g | 47.8 |
| 8 | 22.3 mol=1,900 g | 67 mol=4,100 g | 3 | 17.23 mol=1,780 g | 77.3 |
| 9 | 22.3 mol=1,900 g | 67 mol=4,100 g | 7 | 19.2 mol=1,980 g | 86.2 |
| 10 | 22.3 mol=1,900 g | 67 mol=4,100 g | 7 | 19.5 mol=2,008 g | 87.3 |
| 11 | 22.3 mol=1,900 g | 67 mol=4,100 g | 9 | 21.4 mol=2,203 g | 96 |

EXAMPLES 12–14

Analogously to Examples 1–5, poly(N - acetyl-ethylenimine), $n$ about 3000, was reacted with 1-amino-3-propanol at 200° C. in a similar agitator-equipped autoclave. The reaction times and the amount of reactants employed are set forth in Table 3. For conducting the working-up operation, the reaction mixtures were in each case distilled in a rotary evaporator where any excess 1-amino-3-propanol and thus-formed N-(3-hydroxypropyl) acetamide were separated in this manner. A subsequent redistillation isolated the amide.

TABLE 3

| Example | Poly(N-acetyl-ethylenimine) | 1-amino-3-propanol | Time (hr.) | Amount of amide formed | Degree of deacylation (percent) |
| --- | --- | --- | --- | --- | --- |
| 12 | 0.4 mol=34 g | 1.2 mol=90 g | 12 | 0.0588 mol=6.89 g | 14.7 |
| 13 | 0.4 mol=34 g | 1.2 mol=90 g | 18 | 0.0848 mol=9.94 g | 21.2 |
| 14 | 0.4 mol=34 g | 1.2 mol=90 g | 24 | 0.1317 mol=15.41 g | 32.9 |

EXAMPLE 15

50 g. (0.44 mol) of poly(N-n-butyryl-ethylenimine) was heated with 81 g. (1.33 mol) of ethanolamine to 200° C. in an agitator-equipped autoclave, capacity 250 ml. for 24 hours. By means of vacuum distillation at 200° C./0.15 mm. Hg, N-(2-hydroxyethyl)butyramide was separated from the reaction mixture, together with excess ethanolamine. By redistillation, 44.1 g. (0.336 mol) of N-(2-hydroxyethyl)butyramide could be isolated, corresponding to a deacylation of 76.3%; $n$ was about 2800.

EXAMPLES 16–18

At a molar ratio of 1:3, poly(N-isovaleryl-ethylenimine) was heated with ethanolamine in a 250 ml.-autoclave equipped with an agitator for the time periods indicated to 200° and 220° C., respectively (Table 4). The reaction mixture was worked up analogously to Examples 12–14; $n$ was about 1500.

TABLE 4

| Example | Poly(N-isovaleryl-ethylenimine) | Ethanolamine | Time (hr.) | React. temp. (° C.) | Amount of amide formed | Degree of deacylation (percent) |
| --- | --- | --- | --- | --- | --- | --- |
| 16 | 0.4 mol=51 g | 1.2 mol=73.4 g | 24 | 200 | 0.102 mol=14.79 g | 25.4 |
| 17 | 0.4 mol=51 g | 1.2 mol=73.4 g | 36 | 200 | 0.147 mol=21.3 g | 36.7 |
| 18 | 0.4 mol=51 g | 1.2 mol=73.4 g | 24 | 220 | 0.314 mol=45.52 g | 78.5 |

EXAMPLES 19–24

Further reactions of poly(N-acyl-ethylenimines), $n$ about 2000 to about 4500, with ethanolamine in an agitator-equipped autoclave, capacity 250 ml., are set forth in Table 5. The reaction mixture was worked up in each case analogously to Examples 12–14.

TABLE 5

| Example | Poly(N-acyl-ethylenimine) | Ethanolamine | Time (hr.) | React. temp. (° C.) | Amount of amide formed | Degree of deacylation (percent) |
| --- | --- | --- | --- | --- | --- | --- |
| 19 | Poly(N-benzoyl-ethylenimine) 0.38 mol=56 g. | 1.14 mol=70 g | 12 | 200 | N-(2-hydroxyethyl)benzamide 0.279 mol=46.1 g. | 73.5 |
| 20 | Poly(N-isobutyrylethylenimine) 0.44 mol=50 g. | 1.33 mol=81 g | 24 | 220 | N-(2-hydroxyethyl)isobutyramide 0.022 mol=2.91 g. | ca. 5 |
| 21 | Poly(N-iso-butyryl-ethylenimine) 0.298 mol=33.8 g. | 1.49 mol=91.3 g | 48 | 220 | 0.129 mol=16.9 g | 43.3 |
| 22 | Poly(N-lauroyl-ethylenimine) 0.306 mol=68.9 g. | 0.917 mol=56.1 g | 24 | 220 | N-(2-hydroxyethyl)lauramide 0.066 mol=16.05 g. | 21.6 |
| 23 | Poly(N-p-toluyl-ethylenimine) 0.347 mol=56 g. | 1.04 mol=63.6 g | 24 | 200 | N-(2-hydroxyethyl)-p-toluylamide 0.104 mol=18.7 g. | 30.1 |
| 24 | Poly(N-phenyl-acetyl-ethylenimine) 0.363 mol=58.5 g. | 1.09 mol=66.6 g | 24 | 220 | N-(2-hydroxyethyl)phenylacetamide 0.086 mol=15.49 g. | 23.8 |

EXAMPLE 25

45 g. (0.453 mol) of a copolymer of methyloxazoline and n-propyloxazoline (molar ratio 1:1, $n$ about 2700) was heated in a agitator equipped 250 ml.-autoclave with 83.1 g. (1.36 mol) of ethanolamine for 8 hours to 200° C. The reaction product was worked up analogously to Examples 12–14, isolating 6.88 g. (0.067 mol) of N-(2-hydroxyethyl)acetamide and 8.75 g. (0.067 mol) of N-(2-hydroxyethyl)-butyramide, corresponding to 29.4% deacylation of the copolymer.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the partial deacylation of poly(N-acylalkylenimines) which comprises transamidating at least 5% of a poly(N-acylalkylenimine) of the formula

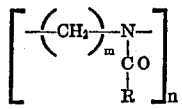

wherein $m$ is 2 or 3, $n$ is an integer of 10–5,000, and R is alkyl of 1–12 carbon atoms, aralkyl of 7–12 carbon atoms, aryl of 6–12 carbon atoms, or aryl of 6–12 carbon atoms with an alkanolamine at a temperature of 150°–250° C.

2. A process according to Claim 1, wherein $m$ is 2.

3. A process according to Claim 1, wherein the reaction is effected in the absence of an inert diluent.

4. A process according to Claim 1, wherein the poly (N-acyl-alkylenimine) is reacted with a molar excess of alkanolamine, based on the acyl groups of the poly(N-acyl-alkylenimine).

5. A process according to Claim 4, wherein the molar ratio of alkanolamine to the acyl groups of the poly(N-acyl-alkylenimines) is 2:1–5:1.

6. A process according to Claim 5, wherein the molar ratio is 3:1.

7. A process according to Claim 1, wherein the alkanolamine is ethanolamine.

8. A process according to Claim 7, wherein the poly (N-acyl-alkylenimine) is poly(N-acetyl-ethylenimine) or poly(N-benzoyl-ethylenimine).

9. A process according to Claim 8, wherein the poly (N-acyl-alkylenimine) is poly(N-acetyl-ethylenimine).

10. A process according to Claim 9 further comprising isolating N-2-hydroxyethyl carboxylic acid amide as a reaction byproduct, converting said byproduct to $\Delta^2$-oxazoline, polymerizing said $\Delta^2$-oxazoline to poly(N-acyl-ethylenimine), and using said poly(N-acyl-ethylenimine) as a starting material in the partial deacylation reaction.

11. A process according to Claim 1, wherein the reaction is conducted in an autoclave under autogenous pressure at 190–220° C.

12. A process according to Claim 1, further comprising recovering partially deacylated poly(N - acyl-alkylenimine) from the resultant reaction mixture by thin-film evaporation.

13. A process according to Claim 1, wherein the reaction is carried out to 10–96% deacylation.

14. A process according to Claim 1, wherein the reaction is effected in an inert solvent selected from the group consisting of methanol and isopropanol.

15. A process according to Claim 4, wherein the alkanolamine is ethanolamine, the poly(N-acyl-alkylenimine) is poly(N-acetyl-ethylenimine) or poly(N-benzoyl-ethylenimine), and the reaction is conducted in an autoclave under autogenous pressure at 190–220° C.

References Cited

UNITED STATES PATENTS

| | | | |
|---|---|---|---|
| 3,640,909 | 2/1972 | Jones et al. | 260—2 EN |
| 3,562,263 | 2/1971 | Litt et al. | 260—2 EN |

OTHER REFERENCES

"Homopolymerization of 2-alkyl and 2-aryl-2-oxazolines" J. of Polymer Science, part A–1, vol. 4 (196), pp. 2253–2265.

WILBERT J. BRIGGS, Sr., Primary Examiner

U.S. Cl. X.R.

252—8.8; 260—239 R